United States Patent
Cooper

(10) Patent No.: US 7,397,142 B1
(45) Date of Patent: Jul. 8, 2008

(54) RENEWABLE ENERGY ELECTRIC POWER GENERATING SYSTEM

(76) Inventor: Willard Cooper, 610 Society Hill, Cherry Hill, NJ (US) 08003

(\*) Notice: Subject to any disclaimer, the term of this patent is extended or adjusted under 35 U.S.C. 154(b) by 0 days.

(21) Appl. No.: 11/820,069

(22) Filed: Jun. 18, 2007

Related U.S. Application Data

(62) Division of application No. 11/253,106, filed on Oct. 18, 2005, now Pat. No. 7,233,079.

(51) Int. Cl.
*F03D 9/00* (2006.01)
*H02P 9/04* (2006.01)

(52) U.S. Cl. .......................... 290/44; 290/55
(58) Field of Classification Search ............... 290/44, 290/55
See application file for complete search history.

(56) References Cited

U.S. PATENT DOCUMENTS

| | | | |
|---|---|---|---|
| 3,484,617 A | 12/1969 | Winsel | 290/44 |
| 4,275,320 A | 6/1981 | Baumann et al. | 310/52 |
| 4,461,957 A * | 7/1984 | Jallen | 290/44 |
| 4,695,736 A * | 9/1987 | Doman et al. | 290/44 |
| 4,700,081 A * | 10/1987 | Kos et al. | 290/44 |
| 4,703,189 A * | 10/1987 | DiValentin et al. | 290/44 |
| 4,926,061 A | 5/1990 | Arreola, Jr. | 290/55 |
| 5,083,039 A * | 1/1992 | Richardson et al. | 290/44 |
| 5,225,712 A | 7/1993 | Erdman | 290/44 |
| 5,359,308 A * | 10/1994 | Sun et al. | 335/216 |
| 5,512,145 A | 4/1996 | Hollenberg | 205/628 |
| 5,512,787 A | 4/1996 | Dederick | 290/4 R |
| 5,592,028 A | 1/1997 | Pritchard | 290/55 |
| 5,798,632 A * | 8/1998 | Muljadi | 322/29 |
| 5,798,633 A * | 8/1998 | Larsen et al. | 323/207 |
| 6,134,124 A * | 10/2000 | Jungreis et al. | 363/34 |

(Continued)

FOREIGN PATENT DOCUMENTS

EP   1 096 144 A3 *   4/2003

(Continued)

OTHER PUBLICATIONS

Geothermal Energy: Idaho National Laboratory, 3 Pages, Jan. 25, 2007.

(Continued)

*Primary Examiner*—Julio Gonzalez
*Assistant Examiner*—Pedro J Cuevas
(74) *Attorney, Agent, or Firm*—Norman E. Lehrer

(57) ABSTRACT

A renewable electric power system includes a high temperature superconducting wind turbine using high temperature superconducting yttrium-barium-copper oxide for the rotor and stator windings as well as a superconducting bearing. Power from the turbine is stored in a high temperature superconducting magnetic storage system that also uses HTS YBCO. Also included is a regenerative solid oxide fuel cell/electrolyzer with steam turbine cogeneration. The system operates on a managed day/night cycle. During daytime, the energy produced by the wind turbines and fuel cells is transmitted to the grid. During nocturnal hours, the wind turbine is used to provide low cost electricity to the reversible fuel cells operating in the electrolysis mode producing hydrogen and oxygen that is stored for later use. Alternatively, the fuel cells can remain in electrolysis mode producing hydrogen and oxygen for the market. A modified interactive system generates power on a continuous twenty-four hour cycle.

3 Claims, 3 Drawing Sheets

U.S. PATENT DOCUMENTS

| | | | |
|---|---|---|---|
| 6,255,008 B1 * | 7/2001 | Iwase | 429/9 |
| 6,305,442 B1 | 10/2001 | Ovshinsky et al. | 141/231 |
| 6,346,797 B1 * | 2/2002 | Perreault et al. | 322/29 |
| 6,369,461 B1 * | 4/2002 | Jungreis et al. | 307/46 |
| 6,509,819 B2 | 1/2003 | Snitchler et al. | 335/216 |
| 6,522,955 B1 * | 2/2003 | Colborn | 700/286 |
| 6,603,231 B2 | 8/2003 | Dombrovski et al. | 310/156.01 |
| 6,666,961 B1 | 12/2003 | Skoczylas et al. | 204/242 |
| 6,670,721 B2 * | 12/2003 | Lof et al. | 290/44 |
| 6,671,195 B2 * | 12/2003 | Perreault et al. | 363/89 |
| 6,672,078 B2 | 1/2004 | Ovshinsky et al. | 62/46.2 |
| 6,738,692 B2 * | 5/2004 | Schienbein et al. | 700/286 |
| 6,745,105 B1 * | 6/2004 | Fairlie et al. | 700/273 |
| 6,787,259 B2 | 9/2004 | Colborn et al. | 429/23 |
| 6,858,953 B2 * | 2/2005 | Stahlkopf | 290/44 |
| 6,882,904 B1 * | 4/2005 | Petrie et al. | 700/295 |
| 6,887,601 B2 | 5/2005 | Moulthrop et al. | 429/17 |
| 6,900,997 B2 * | 5/2005 | Perreault et al. | 363/127 |
| 6,902,837 B2 | 6/2005 | McCluskey et al. | 429/9 |
| 6,906,434 B1 * | 6/2005 | Koeppe et al. | 307/64 |
| 6,921,985 B2 * | 7/2005 | Janssen et al. | 290/44 |
| 6,927,503 B2 * | 8/2005 | Enis et al. | 290/55 |
| 6,933,625 B2 * | 8/2005 | Feddersen et al. | 290/44 |
| 6,949,843 B2 * | 9/2005 | Dubovsky | 307/64 |
| 6,963,802 B2 * | 11/2005 | Enis et al. | 702/2 |
| 7,002,260 B2 * | 2/2006 | Stahlkopf | 290/44 |
| 7,015,595 B2 * | 3/2006 | Feddersen et al. | 290/44 |
| 7,020,562 B2 | 3/2006 | Lillis et al. | 702/23 |
| 7,060,379 B2 | 6/2006 | Speranza et al. | 429/9 |
| 7,067,937 B2 * | 6/2006 | Enish et al. | 290/55 |
| 7,071,579 B2 * | 7/2006 | Erdman et al. | 290/55 |
| 7,075,189 B2 | 7/2006 | Heronemus et al. | 290/44 |
| 7,233,079 B1 * | 6/2007 | Cooper | 290/44 |
| 7,239,044 B1 * | 7/2007 | Atcitty et al. | 307/66 |
| 7,250,691 B2 * | 7/2007 | Enis et al. | 290/55 |
| 7,289,920 B2 * | 10/2007 | Suliman et al. | 702/64 |
| 2001/0225670 | 10/2001 | Ovshinsky et al. | 141/231 |
| 2001/0056330 A1 * | 12/2001 | Wills | 702/60 |
| 2002/0051898 A1 | 5/2002 | Moulthrop, Jr. et al. | 429/17 |
| 2002/0084655 A1 * | 7/2002 | Lof et al. | 290/44 |
| 2002/0176266 A1 * | 11/2002 | Perreault et al. | 363/53 |
| 2003/0015876 A1 * | 1/2003 | Ichinose et al. | 290/44 |
| 2003/0105556 A1 * | 6/2003 | Enis et al. | 700/286 |
| 2003/0168864 A1 | 9/2003 | Heronemus et al. | 290/55 |
| 2003/0227172 A1 * | 12/2003 | Erdman et al. | 290/44 |
| 2004/0013923 A1 | 1/2004 | Molter et al. | 429/25 |
| 2004/0024494 A1 * | 2/2004 | Bayoumi et al. | 700/286 |
| 2004/0027004 A1 * | 2/2004 | Bayoumi et al. | 307/43 |
| 2004/0030457 A1 * | 2/2004 | Bayoumi et al. | 700/286 |
| 2004/0044442 A1 * | 3/2004 | Bayoumi et al. | 700/286 |
| 2004/0084965 A1 * | 5/2004 | Welches et al. | 307/64 |
| 2004/0085787 A1 * | 5/2004 | Perreault et al. | 363/89 |
| 2004/0112247 A1 | 6/2004 | Powell | 105/35 |
| 2004/0145188 A1 | 7/2004 | Janssen et al. | 290/44 |
| 2004/0160216 A1 | 8/2004 | Speranza et al. | 320/140 |
| 2004/0193379 A1 | 9/2004 | Lillis et al. | 702/102 |
| 2004/0207207 A1 * | 10/2004 | Stahlkopf | 290/44 |
| 2004/0267466 A1 * | 12/2004 | Enis et al. | 702/60 |
| 2005/0012397 A1 * | 1/2005 | Weeber et al. | 307/78 |
| 2005/0062290 A1 * | 3/2005 | Stahlkopf | 290/44 |
| 2005/0121214 A1 * | 6/2005 | Gould | 174/40 R |
| 2005/0129996 A1 | 6/2005 | Moulthrop et al. | 429/17 |
| 2005/0225091 A1 * | 10/2005 | Enis et al. | 290/44 |
| 2005/0275225 A1 * | 12/2005 | Bertolotti | 290/44 |
| 2005/0279095 A1 | 12/2005 | Goldman | 60/641.8 |
| 2006/0010866 A1 | 1/2006 | Rehg et al. | 60/641.8 |
| 2006/0017328 A1 * | 1/2006 | Bryde | 307/64 |
| 2006/0055175 A1 | 3/2006 | Grinblat | 290/54 |
| 2006/0068248 A1 | 3/2006 | Ruhl | 429/21 |
| 2006/0087124 A1 * | 4/2006 | Stahlkopf | 290/44 |
| 2006/0199051 A1 | 9/2006 | Bai et al. | 429/17 |
| 2006/0248799 A1 | 11/2006 | Bandhauer et al. | 48/189.2 |
| 2006/0251934 A1 | 11/2006 | Valensa et al. | 429/20 |
| 2006/0251939 A1 | 11/2006 | Bandhauer et al. | 429/26 |
| 2006/0251940 A1 | 11/2006 | Bandhauer et al. | 429/26 |
| 2007/0013192 A1 | 1/2007 | Berkson | 290/43 |
| 2007/0108771 A1 * | 5/2007 | Jones et al. | 290/44 |
| 2007/0120369 A1 * | 5/2007 | Delmerico et al. | 290/44 |
| 2007/0121354 A1 * | 5/2007 | Jones et al. | 363/47 |
| 2007/0159281 A1 * | 7/2007 | Li et al. | 335/284 |

FOREIGN PATENT DOCUMENTS

WO    WO 9747878 A1 * 12/1997

OTHER PUBLICATIONS

How Nuclear Power Works; howstuffworks; 7 Pages, Apr. 13, 2007.
Coal Creek Station; Great River Energy; 5 Pages, Apr. 13, 2007.
Electricity from Natural Gas; U.S. Environmental Protection Agency; 3 Pages, Jul. 19, 2006.

* cited by examiner

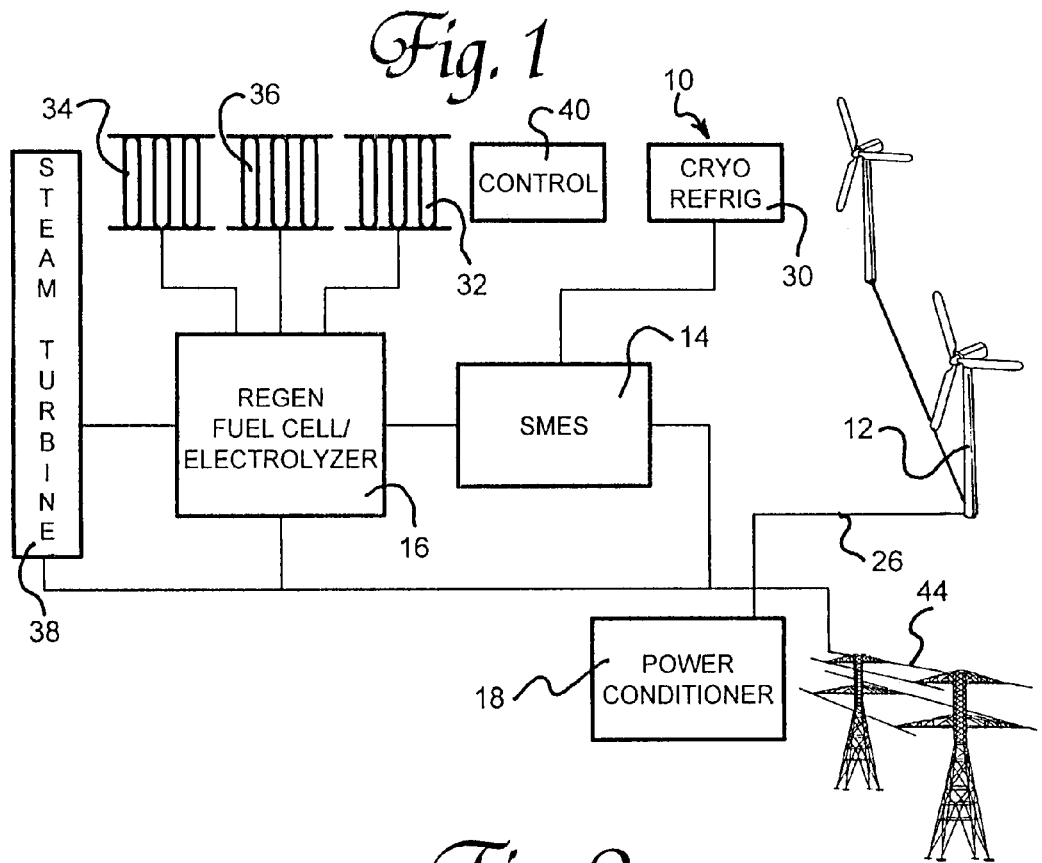
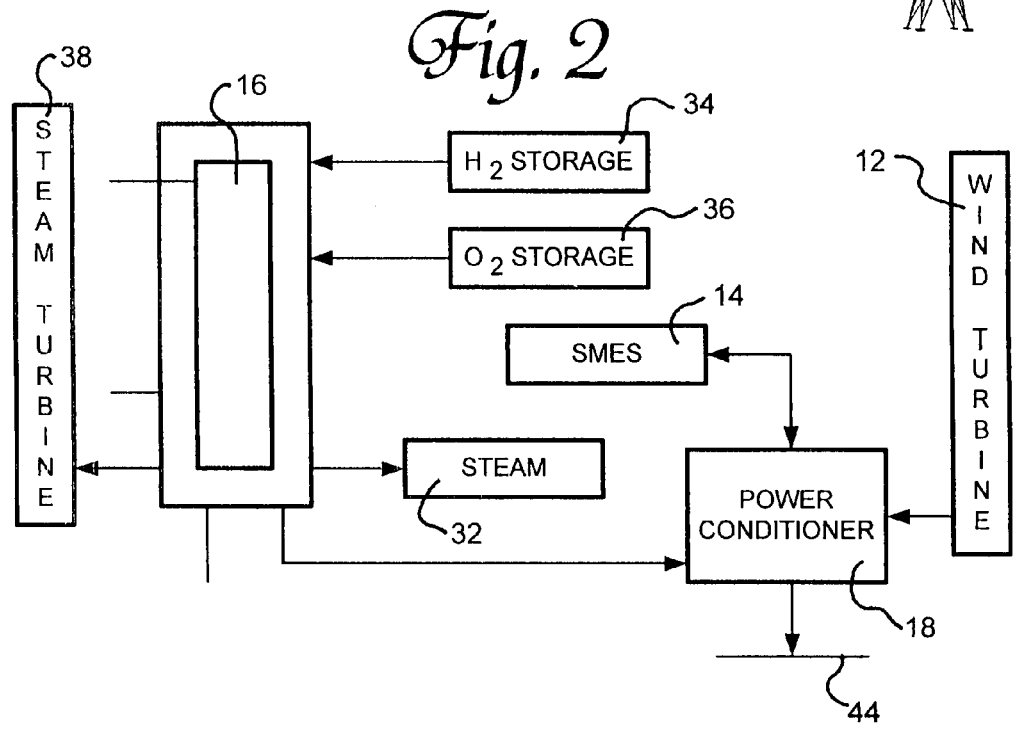

RENEWABLE ENERGY ELECTRIC POWER GENERATING SYSTEM

CROSS-REFERENCE TO RELATED APPLICATION

This application is a division of U.S. patent application Ser. No. 11/253,106, filed Oct. 18, 2005, now U.S. Pat. No. 7,233,079.

BACKGROUND OF THE INVENTION

The present invention is directed toward a renewable energy electric power generating system and, more particularly, toward an integrated renewable energy system comprised of high temperature superconducting wind turbines and regenerative or interactive solid oxide fuel cells/electrolyzers with superconducting magnetic energy storage based on a managed demand cycle.

The world is facing a major energy and clean air challenge. Renewable energy systems using wind, sun, and water and utilizing advanced energy generating technology offer some potential solutions. Unfortunately, the current state of the art of conventional wind turbine generators, energy storage systems, as well as fuel cell/electrolyzer technologies have individually not been fully developed from a standpoint of efficiency and cost effectiveness to meet the challenge.

Current wind turbines for utility use are huge machines that use conventional generator designs that include troublesome gear systems and lack of a commercially viable nighttime off-peak energy storage system. Low temperature superconducting energy storage systems use two-stage liquid helium cryorefrigeration to cool their metallic niobium-titanium or niobium-tin coils and are not cost effective. Also, current first generation high temperature superconducting coil wound energy storage units do not function efficiently at liquid nitrogen temperature. Solid oxide fuel cell systems that generate electricity for utility use are generally designed to use natural gas or methane as the base fuel for hydrogen, thus contributing to air quality degradation. Integrated electrolysis systems have not been fully developed to use the high temperature steam, a byproduct of fuel cell operations, in combination with low priced off-peak produced renewable energy for producing hydrogen in a cost effective manner. The challenge is to effectively integrate a combination of advanced renewable energy systems where the strength of each individual system is utilized to offset the shortcomings of other components of the overall system thus creating a more efficient synergistic result.

SUMMARY OF THE INVENTION

The present invention is a concept for meeting America's growing energy demand through the use of non-polluting electric generating technology utilizing renewable energy. The concept consists of three major advanced energy technologies that are uniquely integrated so as to significantly enhance their overall efficiency for the production of electric power. They are:

1.) A high temperature superconducting wind turbine generator,
2.) A high temperature superconducting magnetic energy storage system,
3.) Either a regenerative or a modified interactive solid oxide fuel cell/electrolyzer.

The conventional wind turbine is being increasingly recognized as a low cost generator of renewable energy. However, the economic potential of high temperature superconducting wind turbine technology has not been fully exploited particularly when operationally integrated with a regenerative solid oxide fuel cell/electrolyzer system to operate on a day/night cycle. In order to optimize wind turbine system efficiency, a number of supporting subsystems are required. A high temperature superconducting magnetic energy storage system compensates for the effects of variable and intermittent winds. High temperature superconducting power conditioning equipment and the connecting power cables are also critical components of the integrated wind-hydrogen system.

This integrated system is specifically designed to operate on a managed day/night or 24 hour cycle. The regenerative system generates electricity during the day when demand is high and creates hydrogen and oxygen at night when demand is very low. However, it is operationally flexible and when provided with an external source of low cost energy generated by the wind turbines can remain in extended electrolysis mode producing hydrogen and oxygen for off-site distribution. The direct interactive system generates only electricity around the clock, feeding its output to the superconducting magnetic energy storage units during the periods of low demand.

A cryogenic system design will employ a multi-use cryorefrigeration system that cools the current carrying high temperature superconducting cables as well as the wind turbine generator coils and bearings and the magnetic energy storage units. Supporting the regenerative fuel cell system are storage vessels for hydrogen and oxygen, the product of the electrolysis process, and the byproduct high temperature steam produced by the fuel cells. The modified solid oxide interactive system does not require hydrogen, oxygen, or high temperature steam storage systems but would require superconducting energy storage units with larger capacity for increased off-peak use.

BRIEF DESCRIPTION OF THE DRAWINGS

For the purpose of illustrating the invention, there are shown in the accompanying drawings forms that are presently preferred; it being understood that the invention is not intended to be limited to the precise arrangements and instrumentalities shown.

FIG. 1 illustrates the general arrangement of the components of a large-scale integrated renewable energy generating system;

FIG. 2 shows the renewable energy power generating system in daytime, peak period, fuel cell operational mode;

DETAILED DESCRIPTION OF THE PREFERRED EMBODIMENTS

Figure 5:
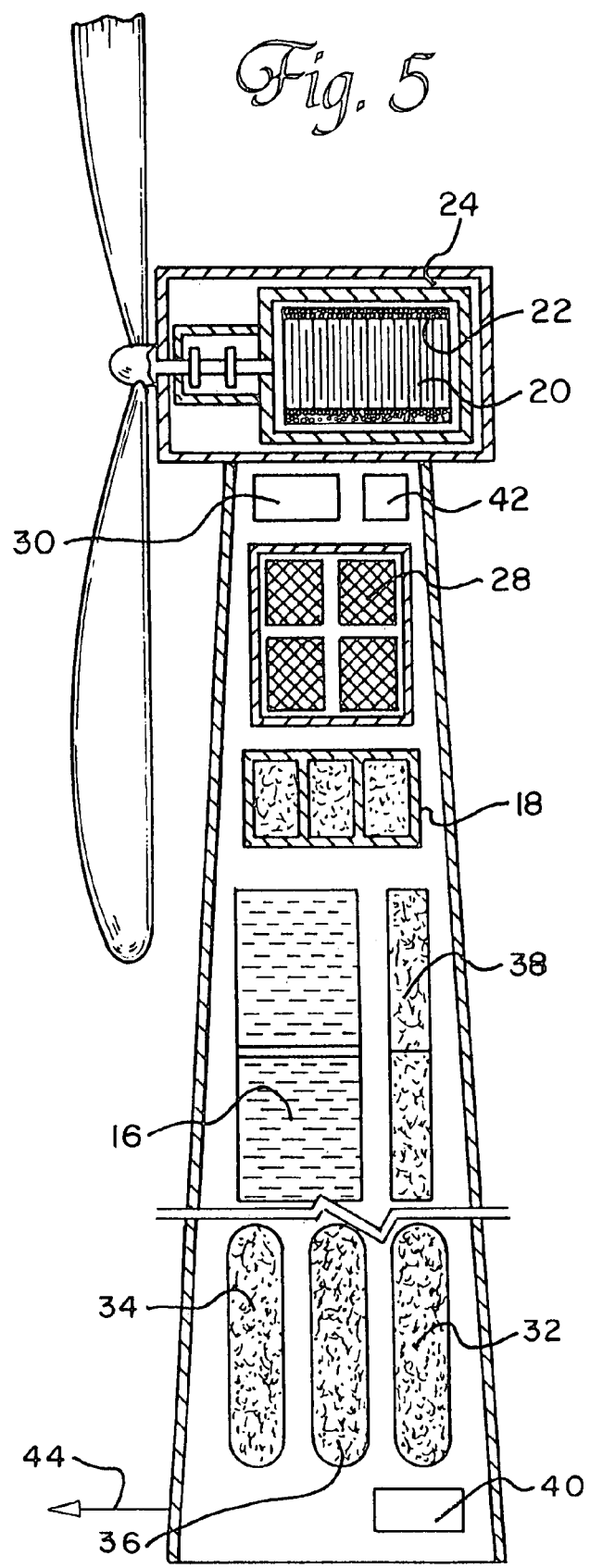
FIG. 5 is a schematic view of a self contained vertically integrated renewable energy power system housed within a stand-alone wind turbine structure.

Referring now to the drawings in detail wherein like reference numerals have been used throughout the various figures to designate like elements, there is shown in the FIGS. 1, 2 and 5 a renewable energy electric power generating system constructed in accordance with the principles of the present invention and designated generally as 10. The general arrangement of the various components of an integrated large-scale renewable energy power generating system 10 is illustrated in FIG. 1. However, the specific details of the high temperature superconducting wind turbine generator are illustrated in FIG. 5, which is a schematic view of a vertically integrated renewable energy power generating system housed within a stand-alone wind turbine structure.

The renewable energy electric power generating system 10 is comprised of three major components incorporating advanced energy technologies that are uniquely integrated so as to significantly enhance their overall efficiency for the production of electric power through the use of non-polluting renewable energy. These three major components include a high temperature superconducting air gap wind turbine generator 12, a high temperature superconducting magnetic energy storage system 14 and either a regenerative or a direct interactive solid oxide fuel cell/electrolyzer 16.

The major components are supported by a number of subsystems that are critical components of this wind-hydrogen-electricity generating system. They include high temperature superconducting power conditioning equipment 18 that includes a superconducting transformer and high temperature superconducting multi-use interconnecting power cables.

The high temperature superconducting air gap wind turbine generator 12 is comprised of high temperature superconducting YBCO or other REBCO wire coil windings for both the rotor 20 and the stator 22 (see FIG. 5). The wind turbine generator and the superconducting non-contact magnetically levitated bearings are preferably contained within a double-walled vacuum vessel 24 that provides insulation for the maintenance of the cryogenic temperature.

Multi-use superconducting electric power cables 26 serve to connect the wind turbines 12 to the high temperature superconducting magnetic energy storage 14 units via the superconducting power conditioning system 18. The superconducting power cables include internal ducts that circulate liquid nitrogen coolant to the wind turbine generators as well as to the SMES system. The power conditioning system 18 includes a superconducting transformer as well as inverters and rectifiers and appropriate and necessary switchgear and protective devices (not shown). The high temperature superconducting magnetic energy storage units 14 are contained within walled vessels 28 that provide vacuum insulation.

A centralized cryogenic refrigeration system 30 circulates liquid nitrogen at an optimum temperature of 65° Kelvin to the superconducting wind turbines and magnetic energy storage units.

The integrated renewable energy system includes regenerative (reversible) or modified interactive solid oxide fuel cell/electrolyzer units 16. The regenerative system uses a single stack of cells that works alternately in the fuel cell mode producing electricity or in an electrolysis mode creating hydrogen and oxygen. The byproduct of the fuel cell cycle is high temperature steam which is forwarded to a storage vessel 32. In the electrolysis mode hydrogen and oxygen are produced which also are piped to the storage vessels 34 and 36, respectively. The byproduct high temperature steam can be used as an option to produce electricity by cogenerating with a steam turbine 38.

The modified interactive solid oxide fuel cell and electrolyzer system 16 consists of two distinct units that are interconnected and that directly feed the hydrogen, oxygen, and high temperature steam to the respective unit without any need for short-term storage.

An electronic control system 40 connects with all components and is used to manage the integrated operation of the complete system.

The foregoing general description is schematically illustrated in FIG. 5 which is in the form of a self-contained, stand-alone vertically integrated renewable energy power generating system housed within a wind turbine structure. It contrasts with the other figures which depict a large-scale integrated renewable energy power generating system with multiple units of wind turbines and regenerative fuel cells. However, in the large-scale configuration the storage vessels, electronic control system, cryorefrigeration system, power conditioning and SMES storage units are all also preferably consolidated in a central location.

The major high temperature superconducting components of the overall integrated system require cooling by a unitary cryogenic refrigeration system that may use liquid nitrogen as the coolant to maintain an optimum temperature at approximately 65 Kelvin. These components include the high temperature superconducting wind turbine generator and its bearing system, superconducting magnetic energy storage units, the power conditioning system that includes a superconducting transformer as well as the connecting system of multi-use superconducting YBCO electric cables which contains ducts for the circulation of the coolant to all superconducting components of the overall system.

The vacuum insulation system along with the vacuum pump apparatus 42 is shown in the schematic details on FIG. 5. These details of the cryogenic and vacuum systems would also apply, though not shown, to all similar superconducting components illustrated in the large-scale system in the remaining figures.

Figure 3:
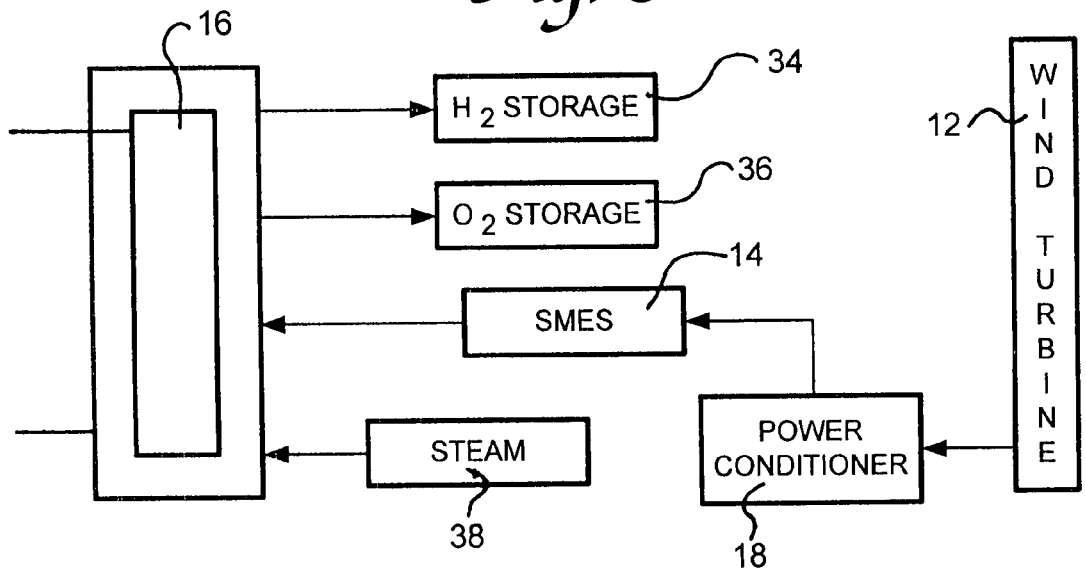
FIG. 3 shows the renewable energy power generation system in nighttime, off-peak, electrolyzer operational mode.
Figure 4:
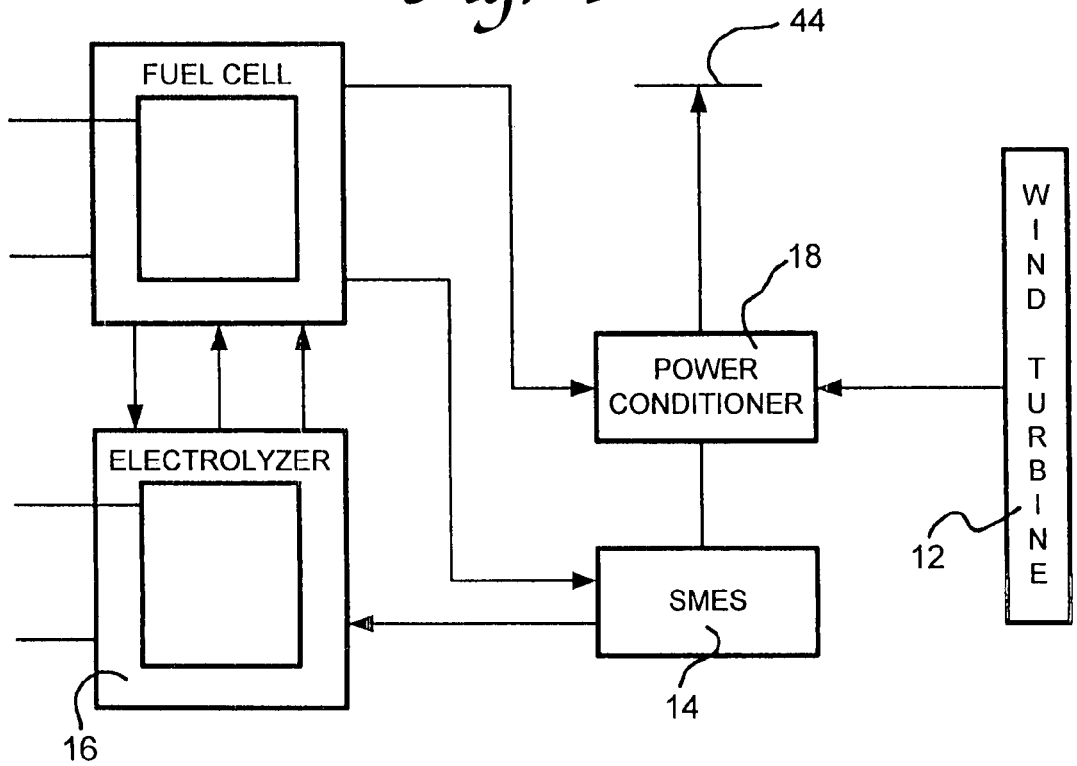
FIG. 4 shows the renewable energy generating system with a modified interactive solid oxide fuel cell and electrolysis system for continuous 24 hour power production.

The large-scale integrated renewable energy generating system 10 of FIG. 1 is capable of three different operational modes. The first is illustrated in FIG. 2 which shows the renewable energy power generating system in operational mode during the daytime peak period. FIG. 3 shows the system during the off-peak nighttime operational mode. FIG. 4 shows the integrated renewable energy power generating system with a modified interactive solid oxide fuel cell and an electrolyzer system for continuous 24 hour power production.

Reference will first be made to FIG. 2 which illustrates the system operations during the daytime peak period part of the cycle. A large part of the United States is within reasonable transmission distance of areas currently deemed appropriate for the generation of wind energy. These areas provide average annual wind speeds desirable for the commercial production of electricity. High temperature superconducting wind turbine generators 12 are up to two-thirds to three-fourths lighter and smaller than conventional generators and along with their air-gap design eliminate the need for gears or transmissions. Wind energy turns the blades on the levitated superconducting shaft of the turbine.

The YBCO or REBCO superconducting wound rotor and stator work to produce electricity more efficiently since current generator designs generally use a non-superconducting warm copper wound stator coil. The direct current generated by the wind turbine is transmitted with appropriate power conditioning 18 to the high temperature superconducting magnetic storage system (SMES) 14. However, since wind is highly erratic, wind speeds can vary greatly. The effective moderation of these variations is critical if the optimum competitive position of wind turbine energy is to be fully realized.

The dc energy stored in the high temperature SMES 14 provides a power leveling function, offsetting the variable peaks and valleys of energy production by the wind turbines 12 caused by variable wind speeds and thereby minimizing any instability in the transmission of power to the grid 44. The electricity stored in the SMES 14 continuously circulates in a series of YBCO or other REBCO wound high temperature superconducting cryogenically cooled non-resistant coil system with very high power energy. The SMES 14 releases a level load of electricity to the power conditioner 18 that modifies the load to appropriate voltage levels and converts the power to alternating current for transmission to the grid 44 during the peak period daytime hours.

During the high demand daytime hours, the regenerative solid oxide fuel cell 16 functions in an electric generating mode using the stored hydrogen and oxygen produced by the system when operating in electrolysis mode during the low demand nighttime cycle. When operating in the power generating fuel cell mode, it produces as a byproduct high temperature (up to 1000° C.) steam. There are two options for the use of this steam. If stored and the temperature is maintained, it can be used during the nighttime reverse electrolysis process, thus significantly reducing the amount of electricity required for the disassociation of the hydrogen and oxygen. If used to cogenerate electricity using a steam turbine 38, the efficiency of the fuel cell system is enhanced.

The dc electricity produced by the fuel cell system 16 is at a constant level and unlike the variable produced by the wind turbine 12 can be sent directly to the power conditioning unit 18 for any needed modification and then is converted to ac for transmission to the grid. If the steam turbine cogeneration option 38 is introduced, then the same process is followed.

FIG. 3 shows the integrated renewable energy power generating system 10 during the low demand nighttime operational mode. The reversible solid oxide fuel cell 16 functions in the electrolysis mode to produce hydrogen and oxygen during off-peak periods. Also, during the low demand nighttime cycle, the high temperature superconducting wind turbine generator 12 does not primarily produce energy for transmission to the grid 44 due to the reduced value of the product. The wind turbine generated dc energy is transmitted to the SMES storage unit 14 after appropriate power conditioning 18. The off-peak electrolysis process is energy intensive and is economically viable when provided with low cost dc electricity produced by the wind turbine 12 during nocturnal hours. The option which utilizes the high temperature steam for the electrolysis process draws on the temperature controlled steam storage system.

It should be noted that there are a number of different storage technologies (not shown) for hydrogen and oxygen that include compressed gas, liquefaction, metal hydrides, etc. If the high temperature steam cogeneration option 38 is exercised, then an external source of deionized water is required for electrolysis. This would also require a greater use of off-peak low value electricity to offset the unavailability of the byproduct steam for electrolysis.

The operational flexibility of the regenerative system is demonstrated by the fact that it can remain in the electrolysis mode producing hydrogen and oxygen over an extended period again using low value, off-peak wind turbine generated stored electricity along with an external source of deionized water.

The third operational mode of an integrated renewable energy power generating system 10 uses a modified interactive solid oxide fuel cell 16 with an integrated but separate solid oxide electrolyzer for continuous 24 hour power production. It is shown in FIG. 4. The hydrogen and oxygen produced by an interactive solid oxide and electrolysis unit is fed continuously to the integrated interactive solid oxide fuel cell 16. The high temperature byproduct steam produced by the fuel cell is likewise fed continuously to the electrolysis unit. The 24 hour requirement for electricity for the electrolysis unit is provided by the SMES system 14 which stores off-peak low cost electricity produced by both the wind turbine 12 and the fuel cell systems 16 during the low demand nighttime hours.

During the high demand high-value daytime hours, both the interactive fuel cell 16 with its level load of electricity and the superconducting wind turbines 12 send their combined dc power to the power conditioner 18 for voltage adjustments and conversion to ac and subsequent transmission to the electric grid 44. Depending on wind conditions, the wind turbine generated power may first have to pass through the SMES system 14 for load leveling purposes.

The present invention may be embodied in other specific forms without departing from the spirit or essential attributes thereof and accordingly, reference should be made to the appended claims rather than to the foregoing specification as indicating the scope of the invention.

I claim:

1. A renewable energy electric power generating system comprising:

a high temperature superconducting wind turbine generator for generating electric power from wind, a support structure for housing said wind turbine generator;

a high temperature superconducting magnetic energy storage system for storing electric energy generated by said wind turbine generator, said energy storing system being housed in said support structure;

means for connecting power from said renewable energy electric power generating system to a power grid, and a power conditioner circuit for properly conditioning said power from said renewable energy electric power generating system before it is connected to said grid.

2. The renewable energy electric power generating system as claimed in claim 1 further including means for controlling the electric power generating system based on the usage of power from said system.

3. The renewable energy electric power generating system as claimed in claim 1 further including a plurality of a high temperature superconducting wind turbine generators for generating electric power from wind.

* * * * *